Aug. 19, 1924.
D. D. BOHANNON
1,505,368
DISK WHEEL
Filed March 19, 1923
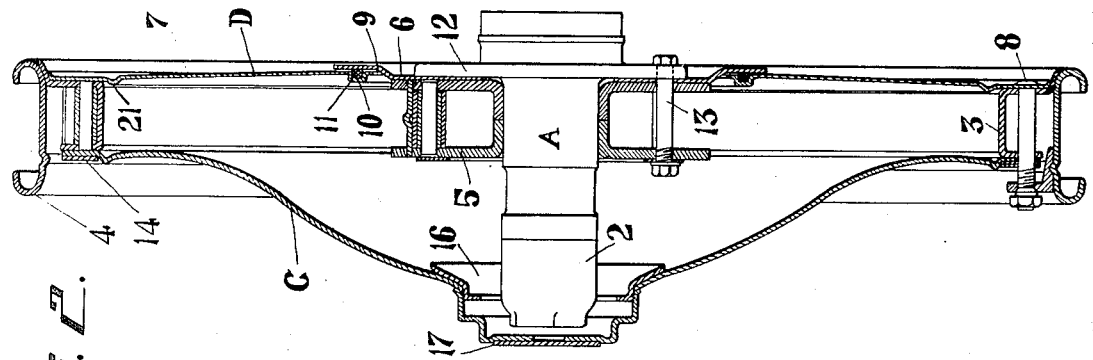
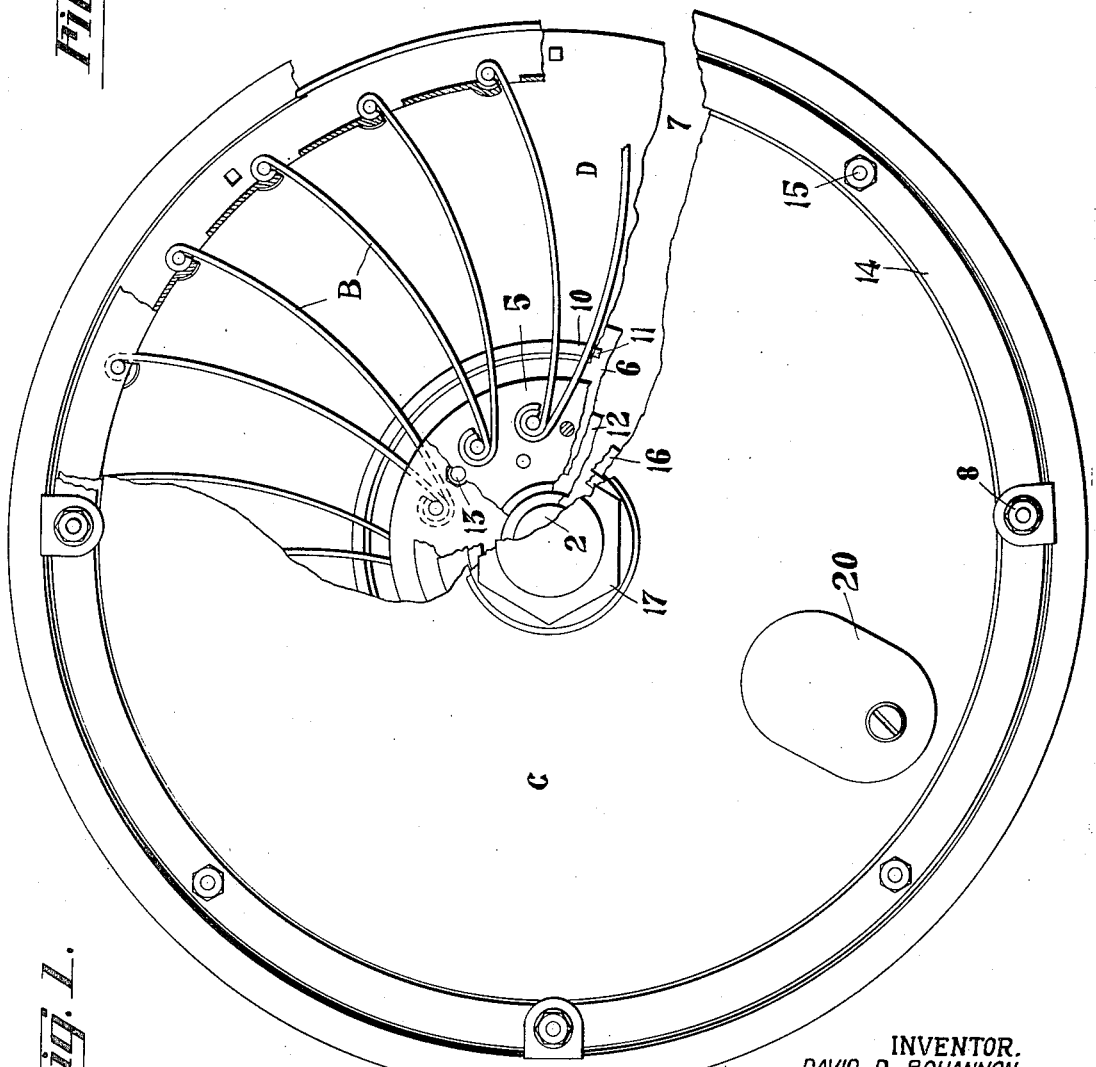
INVENTOR.
DAVID D. BOHANNON.
BY Dewey Strong
Townsend and Loftus
ATTORNEYS Patented Aug. 19, 1924.

1,505,368

UNITED STATES PATENT OFFICE.

DAVID D. BOHANNON, OF OAKLAND, CALIFORNIA, ASSIGNOR TO RESILIENT SAFE-WHEEL COMPANY, OF OAKLAND, CALIFORNIA, A CORPORATION OF CALIFORNIA.

DISK WHEEL.

Application filed March 19, 1923. Serial No. 626,060.

*To all whom it may concern:*

Be it known that I, DAVID D. BOHANNON, a citizen of the United States, residing at Oakland, county of Alameda, and State of California, have invented new and useful Improvements in a Disk Wheel, of which the following is a specification.

This invention relates to disk wheels and especially to the manner of securing the disks to the felloe and the hub of the wheel.

A number of so-called resilient wheels, for instance such as employ telescoping spokes, springs and other resilient mechanisms, have appeared on the market from time to time, but have seemingly been more or less of a failure, at least from a commercial and practical point of view, as they are usually complicated and anything but artistic in appearance, and are furthermore subject to rapid wear due to the cutting action of entering sand, grit dust, etc. The purpose of the present invention is not to improve upon the resilient mechanism interposed between the felloe and hub of the wheel, but conversely to provide a disk-like enclosure which will exclude sand, grit, dust, etc., and which may be applied to practically any type of resilient wheel, regardless of the mechanism employed, and whereby the general or artistic appearance thereof my be greatly improved.

One form which my invention may assume is exemplified in the following description and illustrated in the accompanying drawings, in which—

Fig. 1 is a side elevation of a resilient wheel, partly broken away and partly in section, showing the application of my invention.

Fig. 2 is a central vertical cross-section of Fig. 1.

Referring to the drawings in detail, A indicates the main hub of a wheel, 2 the hub cap, 3 the felloe, B a series of resilient spring spokes interposed between the hub and the felloe, and 4 a clincher rim of the demountable type. A special form of felloe is employed in the present instance and, similarly, a specific form of auxiliary hub as indicated at 5, the hub and auxiliary felloe being employed for the purpose of receiving and supporting the resilient spring spokes B. The felloe and the auxiliary hub disclose a novel structure but this structure is taken care of in my copending application entitled, "Hub and felloe structure for resilient wheels," filed April 16, 1923, Serial No. 632,361. The subject matter of the present application relates to a pair of enclosing disks, generally indicated at C and D, and said disks are so designed that they may be attached to practically any form of resilient wheel. The purposes of the enclosing disks C and D are, first, that of excluding sand, dust, grit, etc., and, secondly, that of producing an artistic appearance which will later be referred to.

The inner disk D consists of two sections as indicated at 6 and 7. The disk 7 is bolted or otherwise secured to the felloe, as indicated at 8. The center portion of the disk is cut away to form a concentric opening 9, and an annular groove 10 is formed adjacent this opening and surrounding the same for the purpose of receiving and retaining a packing ring 11. The disk 6 is secured between a main hub flange 12 and the auxiliary hub 5 by means of bolts 13, and the exterior diameter thereof is slightly larger than the central opening 9; that is, it projects a sufficient distance beyond the packing ring 11 to permit free play of the resilient spokes when the wheel is in use. The two disks slide with relation to each other when the spring spokes yield and as the disk 6 is fairly large in diameter, it is obvious that the packing ring and consequently the central opening 9 will never be exposed, thus preventing the entrance of sand, dust, grit, etc., and at the same time permitting free play of the resilient spokes.

By referring to Fig. 2, it will be noted that an annular groove 21 is formed in the inner disk 7 and that the disk proper is slightly dished or angularly disposed. This is of considerable importance as a spring like tension is thereby exerted on the packing member 11 and a tight joint is always maintained; that is, the dishing or flaring of the inner disk 7 is such that it will be placed under slight compression when the disks are assembled and positioned on the wheel, and it is this tension which is depended upon to maintain the tight joint and to automatically take up wear in the packing member.

The second or exterior disk indicated at C is secured to the outer side of the felloe rim by means of a clamping ring 14 and this is in turn secured by means of bolts 15. The exterior disk C is also provided with a central opening in which is inserted a threaded annular flange 16. This flange may be formed as an integral part of the disk or, it may be welded or otherwise secured thereto as shown in Fig. 2. The threaded flange is employed for the purpose of supporting an exterior hub cap 17 which may be removed when it is desired to grease the axle spindle or the interior of the main hub A. This hub, as previously stated, is provided with the usual hub cap 2 and as access thereto could not be obtained without removing the disk C, it is obvious that the auxiliary hub cap 17 is not only useful, but adds to the general appearance and finish of the wheel. The interior diameter of the threaded flange 16 and the auxiliary hub cap 17 is so large that the hub A and the hub cap 2 carried thereby, are permitted to play freely when the spokes B yield. No sliding joint, such as indicated at 11, is thus required and a complete closure for one side of the disk is formed by a single disk or unit. As previously stated the disks perform two functions, first, that of excluding dust, grit, sand, etc., and, secondly, that of improving the ornamental appearance of the wheel. As this is the case, it is obvious that the disks do not carry any portion of the load, and it is therefore possible to construct them of a fairly thin sheet metal or the like and to curve or stream line the same as shown in Fig. 2 to produce any artistic appearance desired.

A wheel of this character usually employs a solid rubber tire, but in some instances pneumatic tires are used. If this is the case the clincher rim 4 will be perforated to permit the valve stem to pass therethrough, and to gain access to the valve stem when it is desired to inflate the tire, a hand-hole must be provided in the disk C. Such a hand-hole and a cover therefor is shown at 20 in Fig. 1, and it may or may not be employed as desired.

While certain features of the disk like structure are more or less specifically illustrated, I wish it understood that various changes in form and proportion may be resorted to within the scope of the appended claims, similarly, that the materials and finish of the several parts employed may be such as the experience and judgment of the manufacturer may dictate or various uses may demand.

Having thus described my invention, what I claim and desire to secure by Letters Patent is:—

1. In a resilient wheel of the character described, a hub, a felloe, a disk secured to the hub, and an annular disk secured to the felloe, said disk being slightly flared to contact with the hub disk and being constructed of a thin spring metal to exert a sufficient pressure to constantly maintain a rubbing contact.

2. In a resilient wheel of the character described, a hub, a felloe, a disk secured to the hub, an annular disk secured to the felloe, said disk being slightly flared to contact with the hub disk and being constructed of a thin spring metal to exert a sufficient pressure to constantly maintain a rubbing contact, and a resilient packing member interposed between the disks.

DAVID D. BOHANNON.